United States Patent
Laake

(10) Patent No.: US 8,326,537 B2
(45) Date of Patent: Dec. 4, 2012

(54) SURVEY DESIGN USING EARTH OBSERVATION DATA

(75) Inventor: Andreas W. Laake, Kingston (GB)

(73) Assignee: WesternGeco L.L.C., Houston, TX (US)

( * ) Notice: Subject to any disclaimer, the term of this patent is extended or adjusted under 35 U.S.C. 154(b) by 1044 days.

(21) Appl. No.: 11/738,610

(22) Filed: Apr. 23, 2007

(65) Prior Publication Data

US 2007/0195645 A1 Aug. 23, 2007

Related U.S. Application Data

(63) Continuation-in-part of application No. 11/037,699, filed on Jan. 18, 2005, now abandoned.

(60) Provisional application No. 60/537,780, filed on Jan. 20, 2004.

(51) Int. Cl.
*G01V 1/00* (2006.01)

(52) U.S. Cl. .............................. 702/5; 367/68

(58) Field of Classification Search .............. 367/38, 367/68, 73; 702/5
See application file for complete search history.

(56) References Cited

U.S. PATENT DOCUMENTS

| | | | |
|---|---|---|---|
| 4,621,347 A | 11/1986 | Ostrander | |
| 5,083,297 A | 1/1992 | Ostrander | |
| 5,381,338 A | 1/1995 | Wysocki et al. | |
| 5,615,114 A | 3/1997 | Nordin | |
| 5,886,662 A | 3/1999 | Johnson | |
| 5,987,388 A | 11/1999 | Crawford et al. | |
| 5,995,681 A | 11/1999 | Lee et al. | |
| 6,028,819 A * | 2/2000 | Mullarkey et al. | 367/37 |
| 6,035,255 A * | 3/2000 | Murphy et al. | 702/11 |
| 6,044,238 A * | 3/2000 | Rodriguez | 399/106 |
| 6,044,328 A | 3/2000 | Murphy et al. | |
| 6,430,547 B1 | 8/2002 | Busche et al. | |
| 6,493,636 B1 * | 12/2002 | DeKok | 702/17 |
| 6,560,565 B2 | 5/2003 | Roy et al. | |
| 6,925,387 B2 * | 8/2005 | Marin et al. | 702/16 |
| 6,931,378 B2 * | 8/2005 | Rao et al. | 705/26.3 |
| 7,177,882 B2 * | 2/2007 | Xie et al. | 707/104.1 |
| 2001/0033292 A1 * | 10/2001 | Scott et al. | 345/649 |
| 2002/0123844 A1 * | 9/2002 | Valls | 702/5 |
| 2003/0135328 A1 * | 7/2003 | Burns et al. | 702/5 |

FOREIGN PATENT DOCUMENTS

| | | |
|---|---|---|
| EP | 0 400 775 | 12/1990 |
| GB | 2 405 473 | 3/2005 |
| WO | WO 02/073367 | 9/2002 |
| WO | WO 2005/019868 | 3/2005 |

OTHER PUBLICATIONS

Mishra, et al. Using Remote Sensing and GIS technologies as an Aid for Hydrocarbon Exploration in the Assam-Arakan Fold-Thrust belt. Map India 2003 Conference, Jan. 28-31, 2003.*

Everett, et al. Remote sensing and GIS enable future exploration success. World Oil, Nov. 2002, vol. 223, No. 11.*

(Continued)

*Primary Examiner* — Mark Hellner

(57) ABSTRACT

A method for generating one or more maps of a survey area. In one implementation, the method may include receiving earth observation data, decomposing the earth observation data into pixels, georeferencing the earth observation data in pixel form with the curvature of the earth's surface, integrating the earth observation data in pixel form with seismic data, extracting one or more attributes from the integrated data and displaying the extracted attributes on one or more survey maps.

27 Claims, 3 Drawing Sheets

OTHER PUBLICATIONS

Insley, Laake and Robinson, "Satellite based seismic technology case study: Berkine Basin, Algeria," *EAGE 66th Conference & Exhibition*—Paris, France, Jun. 7-10, 2004.

Insley and Laake, "Seismic quality analysis in Algeria: Application of earth observation data sets to oil & gas exploration," *PESGB Extended Abstracts,* London Evening Meeting, Sep. 2003.

Laake, "Satellite based seismic data quality estimation," *EAGE 66th Conference & Exhibition*—Paris, France, Jun. 7-10, 2004.

Shaohua et al., "Applying 3D seismic in a complex mountainous area of Tarim Basin," *The Leading Edge,* pp. 902-905, Sep. 2002.

Yalamanchili and van Nieuwenhuise, Regional gravity and magnetic data usage for seismic survey planning and the integration of 3-D gravity and seismic data in the Santos and Campos Basins, Brazil, *SEG Int'l Exposition and 72nd Annual Meeting,* Salt Lake City, Utah, Oct. 6-11, 2002.

\* cited by examiner

SURVEY DESIGN USING EARTH OBSERVATION DATA

CROSS-REFERENCE TO RELATED APPLICATIONS

This application is a continuation-in-part of U.S. patent application Ser. No. 11/037,699, filed Jan. 18, 2005, now abandoned which claims benefit of U.S. provisional patent application Ser. No. 60/537,780, filed Jan. 20, 2004. Each of the aforementioned related patent applications is herein incorporated by reference.

BACKGROUND

1. Field of the Invention

Embodiments of the present invention generally relate to seismic survey design, and more particularly, to quality control of seismic data.

2. Description of the Related Art

Quality control of surface seismic data is typically measured using source seismic data and receiver seismic data. Source seismic data is typically provided by a seismic source, such as a vibrator. An example of source seismic data that may be used for quality control is a seismic source signal wavelet, which is the time signal measured at several points of the vibrator. The time signal is indicative of data quality and is directly affected by ground conditions, such as elastic properties, gradient and composition of the earth's surface. For example, boulders often cause point loading of the vibrator baseplate, thereby leading to poor signal being transmitted into the ground. Parameters used for quality control include force, total harmonic distortion, and elasticity and stiffness. A high force typically indicates a high distortion, and hence, a low quality of source signal. If a vibrator is operated in feedback mode, force typically increases on soft ground. Total harmonic distortion is indicative of the fidelity of the source signal. Elasticity and stiffness provide estimates of the elastic behavior of the ground below the vibrator baseplate and are therefore ideal calibration parameters for seismic data quality.

Quality control of seismic data at the seismic receivers is typically measured in a recording truck immediately after recording. Quality of seismic data at the receivers is often affected by non-linearity of the source signal and receiver coupling conditions. In soft ground, geophone coupling to the ground may lead to resonance and, therefore, high distortion of the seismic data. In addition, ambient noise from installations and natural sources, such as wind and water, may degrade data quality. Parameters used for quality control at the seismic receivers include noise, total harmonic distortion, offsets and drifts. Data quality of source and receiver signals generally depends on the properties at the location where the measurements are taken.

Current seismic technology, however, performs quality control on seismic data at the source and receivers only after acquisition of seismic data. Accordingly, a need exists in the art for performing quality control on seismic data prior to acquisition of seismic data to provide an opportunity to avoid or compensate for potential problem locations.

SUMMARY

Described herein are implementations of various techniques directed to a method for generating one or more maps of a survey area. In one implementation, the method may include receiving earth observation data, decomposing the earth observation data into pixels, georeferencing the earth observation data in pixel form with the curvature of the earth's surface, integrating the earth observation data in pixel form with seismic data, extracting one or more attributes from the integrated data and displaying the extracted attributes on one or more survey maps.

In another implementation, the method may further include calibrating the extracted attributes with seismic quality control data.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Estimation of surface characteristics from earth observation data (or satellite imagery) is an emerging technology. Earth observation data is useful for various purposes, including mapping of surface mineral deposits, flood monitoring and infrastructure planning. Satellites are typically equipped with sensors that measure reflected energy in visible-to-infrared wavelengths, radiated thermal infrared energy, and radar backscatter information about the earth's surface. Combining these data allows characterization of different types of surfaces. The algorithms for extracting certain surface characteristics are well known in the art.

Table 1 below gives an overview of the information that can be obtained from satellite imagery.

TABLE 1

| Wave type and band | Wavelength | Surface feature |
|---|---|---|
| Visible bands (VIS) | 0.40–0.75 m | Infrastructure, digital elevation model (DEM), water features |
| Near infrared bands (NIR) | 0.75–1.20 m | Vegetation |
| Mid infrared bands (MIR) | 1.20–2.0 m | Surface features |
| Short-wave infrared bands (SWIR) | 2.0–5.0 m | Rock types |
| Thermal infrared bands (TIR) | 5.0–13.0 m | Lithology and mineralogy |
| Microwave synthetic aperture radar (SAR) | 5.6 cm | Moisture, texture |

The spectral bandwidth available from modern satellite imagery allows identification of surface obstacles as well as lithological and mineralogical surface characterization. Satellite imagery provides densely sampled maps of surface attributes, whereas seismic information only provides data along source and receiver lines. Processing and interpretation of seismic data, however, require spatially continuous data to create appropriate data models. This opens a range of opportunities for satellite imagery to extrapolate sparse surface seismic data with densely sampled earth observation data.

One or more implementations of various techniques described herein are aimed at providing geographically accurate seismic quality maps that are based on surface and near-surface features compiled from a combination of satellite and derived data. In this manner, major areas of poor seismic data quality, such as sand dunes, sabkha, marshlands, caliche horizons and barren rock, can be mapped. Such maps are configured to reduce the risk of acquiring poor-quality seismic data. These maps may be used during survey design to provide data quality estimates, during acquisition to avoid problematic locations within the survey area and during data processing as a guide for interpolating the seismic data. The extent to which these maps may be used during survey design, acquisition and data processing will be discussed in more detail in the following paragraphs.

Figure 1:
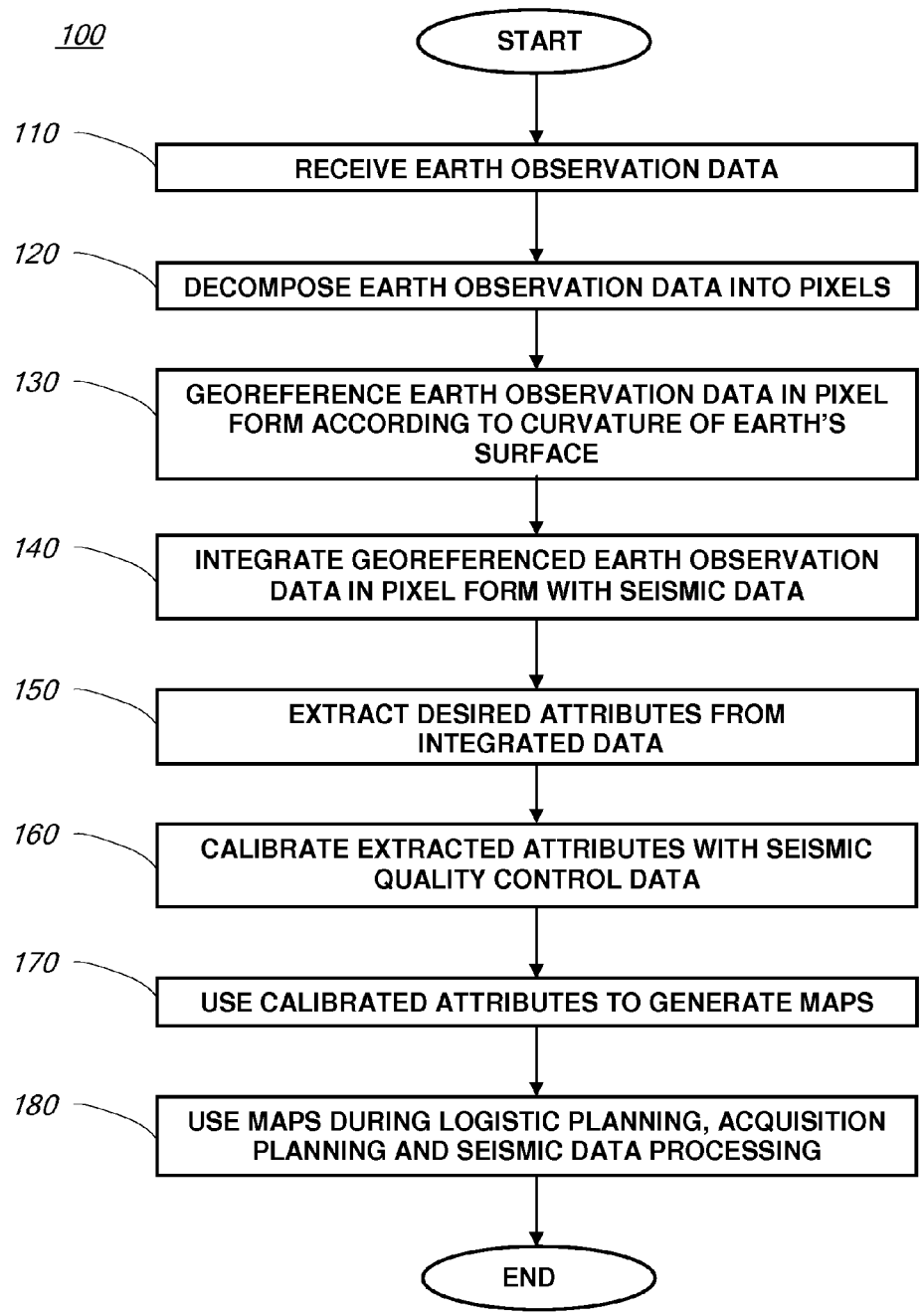
FIG. 1 illustrates a method for generating one or more survey maps in accordance with one or more embodiments of the invention.

FIG. 1 illustrates a method 100 for generating one or more survey maps in accordance with implementations of various techniques described herein. At step 110, earth observation data or satellite imagery of a survey area may be received. The earth observation data may be obtained from any source commonly known by persons of ordinary skill in the art. The earth observation data may be received as images in specific frequency bands ranging from visible light bands to thermal infrared bands. The earth observation data may also include radar data from synthetic aperture radar.

At step 120, the earth observation data may be decomposed into pixels. In one implementation, the size of the pixels may be customized based on the resolution of the output grid. The resolution of the output grid may be based on the multi-spectral sub-image having the highest resolution. A typical output grid may be about 30 meters, which may correspond to a typical pixel size for short wave infrared satellite imagery.

In one implementation, the earth observation data may be decomposed into pixels by separating the multi-band satellite data set into individual bands, which may be represented as image layers in the database. Each band in the image layer may then be split into individual pixels. This process may be represented by S=pixel matrix $[S_i(x,y)]$, where S represents the satellite image layer, i represents the band of satellite image in the database and (x, y) represent east and north coordinates. Once the pixel matrix is completed on a georeferenced grid, each pixel may be represented as a vector of values from each image layer, as shown in:

$$P(x,y)=(S1, S2, \ldots Sn),$$

where n is the number of image layers in the database.

The image layers in the database may be processed using algorithms between various $S_i$ across the entire East-North plain, which is the matrix created from all x and y values. The algorithms may include correlating pixel values from two or more image layers to provide information of consistency between the image layers, calculating the difference between pixel values to show the difference between the image layers, and any other algorithm that combines pixel values from two or more image layers, e.g., multiplying the pixel values to determine the correlation, dividing the pixel values to obtain minute differences and the like.

At step 130, the earth observation data in pixel form may then be georeferenced according to the curvature of the earth's surface. This step may include associating the earth observation data in pixel form with earth surface coordinates and warping the earth observation data in pixel form to the curvature of the earth's surface. The earth observation data in pixel form may be georeferenced using various interpolation techniques, such as one encoded in ArcView available from ESRI from Redlands, Calif.

At step 140, the georeferenced earth observation pixels may be integrated with seismic data, which has previously been georeferenced according to the curvature of the earth's surface. As such, the seismic data is also in pixel form. In one implementation, the seismic data may be legacy seismic data. Seismic data as used herein may refer to receiver data, i.e., data recorded at the receivers, and source and receiver quality control (QC) attributes, which may also be referred to as seismic attributes.

At step 150, one or more desired attributes from the integrated data may be extracted. In one implementation, land use information, such as infrastructure, vegetation, rivers and mountains, and digital terrain model may be extracted from the integrated data. Digital terrain models, which may often be referred to as digital elevation models, provide the topography and surface gradient of the survey area. Both infrastructure and digital terrain models may be indicative of the safety and accessibility of the survey area for seismic data acquisition. For example, survey area with steep slopes, such as sand dunes, may hamper seismic data acquisition since the steep slopes may cause the seismic source, e.g., vibrator, to roll over. The digital terrain models therefore may be used to determine the surface gradient of a survey area and identify locations within the survey area that may be inaccessible due to their steep gradient. In addition to safety and accessibility to the survey area, digital terrain models may also be indicative of locations within the survey area with poor data quality. That is, digital terrain models may be used to identify locations with steep slopes that may cause the vibrators to slide, and thereby compromising the quality of seismic data acquired at those locations. In one implementation, locations with a slope exceeding a predetermined slope may be determined unsafe, inaccessible or conducive to poor data quality. Earth observation data obtained by visible, near and mid infrared may be used to identify land use information and digital terrain models in the integrated data.

Another set of attributes that may be extracted from the earth observation data includes objects, such as rocks or boulders, having diameters greater than 20 cm. Rocks or boulders that have less than 20 cm diameter typically do not pose a problem since they can be crushed or smashed into the ground by the vibrator. Rocks or boulders with diameters exceeding 20 cm, however, may be indicative of locations within the survey area that may cause vibrator coupling and point loading problems, which typically occur when a vibrator baseplate is disposed on a rock or boulder. Such problems often result in high distortion of the transmitted signal due to inadequate coupling of the baseplate to the ground, which leads to poor vibrator signal quality, and severe damage to the baseplate. As such, rocks and boulders with diameters exceeding 20 cm may be used to identify locations within a survey area that are conducive to poor data quality. Earth observation data obtained by short wave infrared may be used to identify rocks and boulders in the integrated data.

Yet another set of attributes that may be extracted from earth observation data includes soft ground that would present coupling problems to the source or receivers. Soft ground is generally characterized by poor consolidation due to lack of binding agent between the grains composing the earth's surface. Examples of soft ground include drainage patterns, wadis, sand dunes, sabkha, gypsum, caliche horizons and the like. Earth observation data obtained by short wave infrared may be used to identify sand dunes in the integrated data. Earth observation data obtained by thermal infrared may be used to identify drainage patterns, wadis, sabkha, caliche horizons and gypsum in the integrated data.

At step 160, the extracted attributes may be calibrated with seismic quality control data. Calibrating the attributes with seismic quality control data may include correlating the extracted attributes with force and distortion data of the source signals, which may be obtained from various sources, such as post service sweep (PSS) data, full waveform attribute data, receiver attribute data and the like.

Calibrating the attributes with seismic quality control data may include correlating the extracted attributes with characteristic surface wave velocity, attenuation, resonance, magnitude and spectral characteristic of the receiver signals, which may be obtained from the processing of shot gathers for spectral contents.

At step 170, the extracted, calibrated attributes may be plotted into one or more survey maps. In one implementation, the extracted, calibrated attributes may be used to generate a visible light image map. The visible light image map may provide information regarding land use information, such as rivers, mountains, vegetation, infrastructure and the like. As such, the visible light image map may be used to identify unsafe and inaccessible locations within a survey area. A permit may typically be required for access into these locations.

In another implementation, the extracted, calibrated attributes may be used to generate a synthetic aperture radar (SAR) derived roughness map. This second map may be configured to illustrate rocks and boulders with diameters exceeding 20 cm, which may be indicative of locations that may cause vibrator coupling and point loading problems.

In yet another implementation, the extracted, calibrated attributes may be used to generate a surface lithology map. This third map may be configured to illustrate soft ground areas that would present coupling problems to the source or receivers. Once these maps are generated, they may be stored in a geographic information system (GIS) database.

At step 180, these maps may be used during logistic planning, acquisition planning and seismic data processing. Land seismic surveys typically require a substantial amount of logistic planning. The location and nature of surface features, such as rocks or sand, often play an important factor in efficient logistic planning. The logistic aspects of survey planning primarily address accessibility of the source and receiver points for vehicles and line crew. As such, during logistic planning, since the earth observation data may provide high resolution information about the infrastructure and terrain on the survey area, these maps provide a tool for determining safe and accessible locations within the survey area. The maps may also aid in the optimization of survey design for data quality. That is, since the earth observation data may provide information about the earth surface characteristics, the maps may be used to identify locations within the survey area that are prone to coupling problems for the source and receivers. Further, in locations where no source or receivers can be placed, the maps may also serve as a guide to the selection of replacement source and receivers. These replacements are used in lieu of the originally planned source and receivers to provide better data quality by using a slightly different geometry.

During acquisition, the maps may be used to identify inaccessible and unsafe locations. In this manner, locations with a high risk of point loading and coupling problems to the source or receivers can be avoided during acquisition.

With respect to data processing, current acquisition technologies merely provide seismic data along source and receiver lines, and hence, i.e., only a mesh of data, instead of a densely sampled grid. Current data processing technologies typically use interpolation to fill the absence of data between the source and receiver lines, which often leads to incorrect interpolations and errors. The maps in accordance with implementations of various techniques described herein may provide a densely sampled grid of surface and near-surface information from earth observation data, and thus allow interpolation of seismic data along topographic, geologic and lithologic features identified on the earth observation data. In this manner, the earth observation derived elastic property attributes may be used to fill the gaps in the seismic data between source and receiver lines.

Various techniques for using earth observation data in combination with seismic data to identify obstacle areas may exist today. However, these techniques merely use earth observation data as a background image for comparison with the seismic data image, i.e., the earth observation data as a whole is used as a bitmap image for visual image comparison. None of these techniques uses earth observation data and seismic data as pixelized georeferenced value matrices which treat all information as point data. Since these techniques do not teach that the earth observation data may be decomposed into individual pixels, these techniques do not teach that the earth observation data may be georeferenced according to the curvature of the earth's surface and may then be integrated with seismic data. Only the pixelization of all data sets, i.e., the earth observation data and the seismic data, and the georeferencing of these data sets in a joint database provides full access to the correlation between all data layers.

Figure 3:
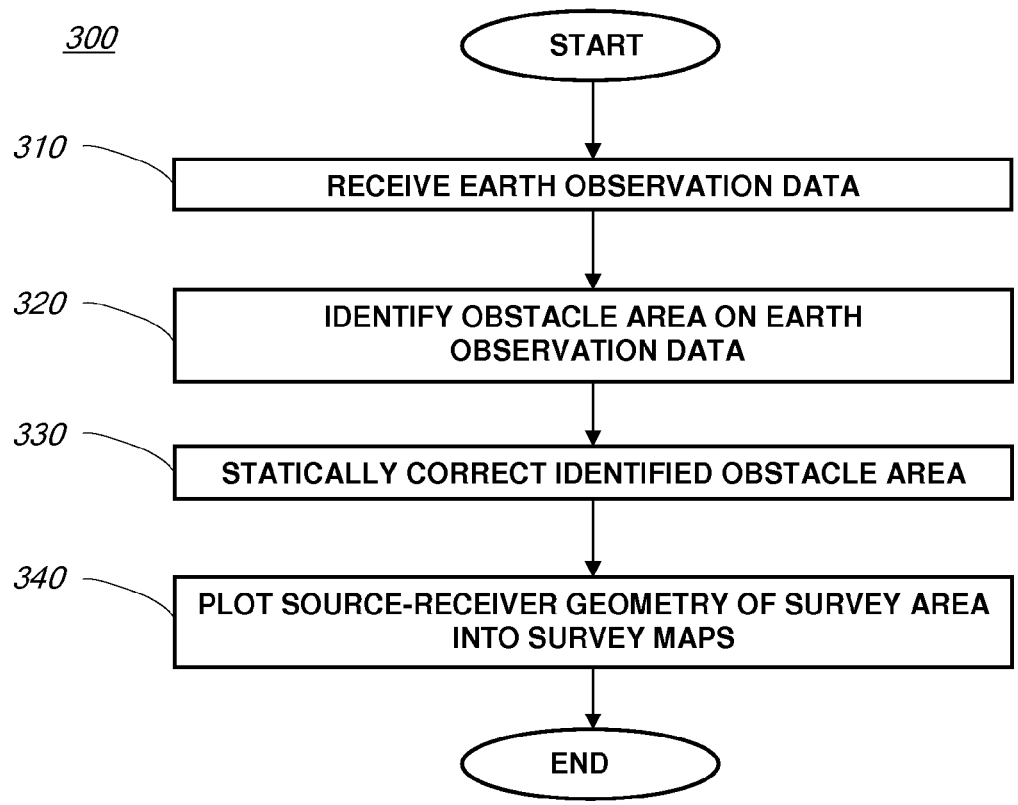
FIG. 3 illustrates a prior art technique for using earth observation data in combination with seismic data to identify obstacle areas.

FIG. 3 illustrates a flow diagram of an existing technique 300 for identifying obstacle areas using earth observation data. Technique 300 is described in Applying 3D Seismic In A Complex Mountainous Area Of Tarim Basin by Z. Shaohua et al., Bureau of Geophysical Prospecting, CNPC, China, The Leading Edge September 2002 ("Shaohua"). At step 310, earth observation data or satellite imagery, i.e., a satellite image, of a survey area is received. At step 320, an obstacles area on the earth observation data is manually identified. For example, the obstacle area may include geological outcrops. At step 330, the identified obstacle area is statically corrected. More specifically, the identified obstacle area is divided into various lithologic blocks and lay out control points. The velocities are then updated by deriving the refractor velocity from the static corrections. The long wavelength static correction is then handled by introducing the "middle reference layer" under the high velocity layer. The model based first break refractions are then calculated. At step 340, the source-receiver geometry of the survey area is plotted into one or more survey maps.

Implementations of various techniques described herein differ from the Shohua technique. For example, the Shaohua technique does not teach or disclose decomposing the earth observation data into pixels, as shown at step 120 of FIG. 1. The Shaohua technique merely uses the image form of the earth observation data. Likewise, the Shaohua technique does not teach or disclose georeferencing the earth observation data in pixel form to the curvature of the earth's surface, as shown in step 130 of FIG. 1. Shaohua never mentions decomposing the earth observation data into pixels, let alone georeferencing the earth observation data in pixel form to the earth's surface. Finally, Shaohua also does not teach or disclose calibrating the extracted attributes with seismic quality control data, as described at step 160 in FIG. 1.

Figure 2:
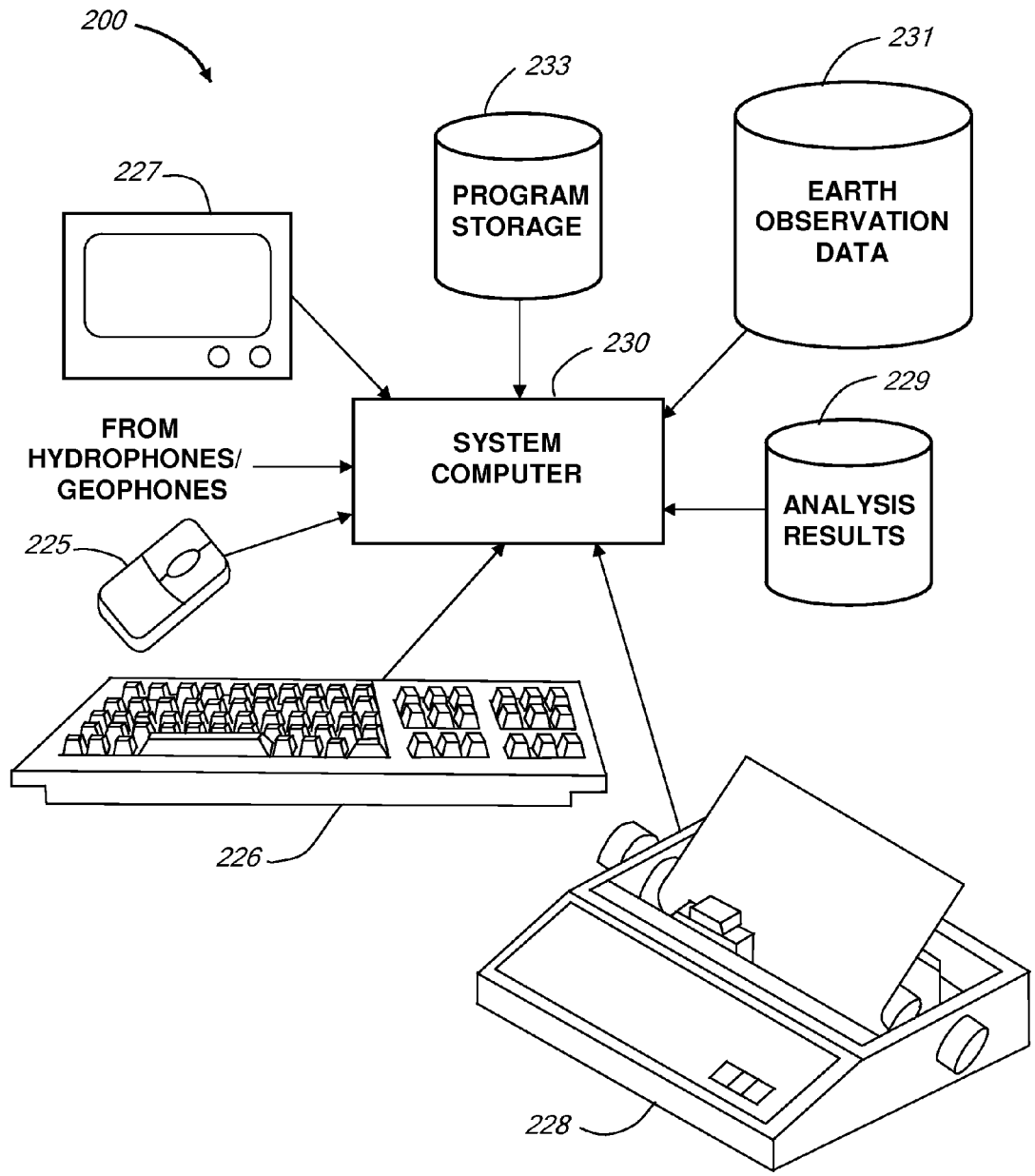
FIG. 2 illustrates a computer network, into which embodiments of the invention may be implemented.

FIG. 2 illustrates a computer network 200, into which embodiments of the invention may be implemented. The computer network 200 includes a system computer 230, which may be implemented as any conventional personal computer or workstation, such as a LINUX-based workstation. The system computer 230 is in communication with disk storage devices 229, 231, and 233, which may be external hard disk storage devices. It is contemplated that disk storage devices 229, 231, and 233 are conventional hard disk drives, and as such, will be implemented by way of a local area network or by remote access. Of course, while disk storage devices 229, 231, and 233 are illustrated as separate devices, a single disk storage device may be used to store any and all of the program instructions, measurement data, and results as desired.

In one embodiment, earth observation data are stored in disk storage device 231. The system computer 230 may retrieve the appropriate data from the disk storage device 231 to perform the survey maps generation methods according to program instructions corresponding to various embodiments described herein. The program instructions may be written in a computer programming language, such as C++, Java and the like. The program instructions may be stored in a computer-readable memory, such as program disk storage device 233. Of course, the memory medium storing the program instructions may be of any conventional type used for the storage of computer programs, including hard disk drives, floppy disks, CD-ROMs and other optical media, magnetic tape, and the like.

According to the preferred embodiment of the invention, the system computer 230 presents output primarily onto graphics display 227, or alternatively via printer 228. The system computer 230 may store the results of the methods described above on disk storage 229, for later use and further analysis. As such, the survey maps may be stored in the disk storage 229, which may also be commonly referred to as the geographic information system (GIS) database. The keyboard 226 and the pointing device (e.g., a mouse, trackball, or the like) 225 may be provided with the system computer 230 to enable interactive operation.

The system computer 230 may be located at a data center remote from the survey region. The system computer 230 is in communication with equipment configured to receive the earth observation data. These data, after conventional formatting and other initial processing, may be stored by the system computer 230 as digital data in the disk storage 231 for subsequent retrieval and processing in the manner described above. While FIG. 2 illustrates the disk storage 231 as directly connected to the system computer 230, it is also contemplated that the disk storage device 231 may be accessible through a local area network or by remote access. Furthermore, while disk storage devices 229, 231 are illustrated as separate devices for storing earth observation data and analysis results, the disk storage devices 229, 231 may be implemented within a single disk drive (either together with or separately from program disk storage device 233), or in any other conventional manner as will be fully understood by one of skill in the art having reference to this specification While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating one or more maps of a survey area, comprising:
    receiving satellite imagery data-of the survey area;
    decomposing, via a system computer, the satellite imagery data into pixels, wherein at least one pixel represents a plurality of image values from the satellite imagery data;
    integrating the satellite imagery data in pixel form with seismic data;
    extracting one or more attributes from the integrated satellite imagery data; and
    displaying the extracted attributes on one or more survey maps on a display device.

2. The method of claim 1, further comprising georeferencing the satellite imagery data in pixel form with the curvature of the earth's surface prior to integrating the satellite imagery data in pixel form with seismic data.

3. The method of claim 2, wherein georeferencing the satellite imagery data in pixel form with the curvature of the earth's surface comprises associating the satellite imagery data in pixel form with one or more earth surface coordinates and warping the satellite imagery data in pixel form to the curvature of the earth's surface.

4. The method of claim 1, wherein integrating the satellite imagery data in pixel form with seismic data comprises integrating the satellite imagery data in pixel form with legacy seismic data.

5. The method of claim 1, wherein integrating the satellite imagery data in pixel form with seismic data comprises integrating the satellite imagery data in pixel form with seismic data that has been georeferenced to the curvature of the earth's surface.

6. The method of claim 1, wherein the attributes comprise a digital terrain model.

7. The method of claim 6, wherein the attributes further comprise land use information.

8. The method of claim 6, wherein the digital terrain model provides a topography and surface gradient of the survey area.

9. The method of claim 6, wherein the digital terrain model is extracted from the satellite imagery data obtained from at least one of visible, near and mid infrared light.

10. The method of claim 7, wherein the land use information are extracted from the satellite imagery data obtained from at least one of visible, near and mid infrared light.

11. The method of claim 7, wherein the land use information comprise information regarding at least one of infrastructure, vegetation, rivers and mountains.

12. The method of claim 7, further determining, in the land use information and the digital terrain model, locations having a slope exceeding a predetermined slope as unsafe and inaccessible locations within the survey area.

13. The method of claim 1, wherein the attributes comprise information regarding rocks.

14. The method of claim 13, wherein the information regarding rocks is extracted from the satellite imagery data obtained from short wave infrared light.

15. The method of claim 13, further comprising determining, in the information regarding rocks, locations having rocks of a predetermined size as being conducive to vibrator coupling and point loading problems within the survey area.

16. The method of claim 1, wherein the attributes comprise information regarding soft ground.

17. The method of claim 16, wherein the information regarding soft ground comprises information regarding at least one of drainage patterns, wadis, sand dunes, sabkha, gypsum marshlands, and caliche horizons.

18. The method of claim 16, wherein the information regarding soft ground is extracted from the satellite imagery data obtained from short wave infrared light or thermal infrared light.

19. The method of claim 1, wherein the maps comprise a visible light image map illustrating land use information within the survey area.

20. The method of claim 1, wherein the maps comprise a surface lithology map illustrating soft ground information within the survey area.

21. A method for generating one or more maps of a survey area, comprising:
  receiving earth observation data;
  decomposing, via a system computer, the earth observation data into pixels, wherein at least one pixel represents a plurality of image values from the earth observation data;
  integrating the earth observation data in pixel form with seismic data;
  extracting one or more attributes from the integrated data;
  calibrating the extracted attributes with seismic quality control data; and
  displaying the extracted attributes on one or more survey maps, on a display device.

22. The method of claim 21, wherein calibrating the extracted attributes comprises correlating the extracted attributes with at least one of force and distortion information of the source signals and at least one of characteristic surface wave velocity, attenuation, resonance, magnitude and spectral characteristic of the receiver signals.

23. A method for generating one or more maps of a survey area, comprising:
  receiving satellite imagery data of the survey area;
  decomposing, via a system computer, the satellite imagery data into pixels, wherein at least one pixel represents a plurality of image values from the satellite imagery data;
  georeferencing the satellite imagery data in pixel form with the curvature of the earth's surface;
  integrating the satellite imagery data in pixel form with seismic data;
  extracting one or more attributes from the integrated satellite imagery data; and
  displaying the extracted attributes on one or more survey maps on a display device.

24. The method of claim 23, further comprising determining, in the survey maps, locations having soft ground as areas that are prone to ground coupling problems for source and receivers within the survey area, wherein soft ground comprises at least one of drainage patterns, wadis, sand dunes, sabkha, gypsum marshlands, and caliche horizons.

25. The method of claim 23, further comprising calibrating the extracted attributes with seismic quality control data.

26. The method of claim 23, further comprising determining, in the survey maps, locations having a slope exceeding a predetermined slope as unsafe and inaccessible locations within the survey area.

27. The method of claim 1, wherein the image values comprise one or more types of data selected from the group consisting of: visible bands, near infrared bands, mid infrared bands, short-wave infrared bands, thermal infrared bands, and microwave synthetic aperture radar (SAR).

* * * * *